United States Patent [19]
Saunders et al.

[11] Patent Number: 5,892,803
[45] Date of Patent: Apr. 6, 1999

[54] DETERMINATION OF SYMBOL SAMPLE TIMING USING SOFT DECISIONS

[75] Inventors: Simon R. Saunders, Guildford; Charles J. H. Razzell, Cambridge, both of England

[73] Assignee: U.S. Philips Corporation, New York, N.Y.

[21] Appl. No.: 692,147

[22] Filed: Aug. 5, 1996

[30] Foreign Application Priority Data

Aug. 8, 1995 [GB] United Kingdom ............... 9516230

[51] Int. Cl.$^6$ ........................................ H04L 7/00
[52] U.S. Cl. ................................ 375/355; 375/342
[58] Field of Search ................... 375/331, 342, 375/354, 355

[56] References Cited

U.S. PATENT DOCUMENTS

| | | | |
|---|---|---|---|
| 4,578,800 | 3/1986 | Yasuda et al. | 375/354 |
| 4,596,024 | 6/1986 | Thomson | 375/347 |
| 4,941,155 | 7/1990 | Chuang et al. | 375/330 |
| 5,206,889 | 4/1993 | Unkrich | 377/20 |
| 5,259,005 | 11/1993 | LaRosa et al. | 375/355 |
| 5,414,730 | 5/1995 | Lundquist et al. | 375/208 |
| 5,535,252 | 7/1996 | Kobayashi | 375/371 |
| 5,602,879 | 2/1997 | Wada | 375/355 |
| 5,625,649 | 4/1997 | Ishizu | 375/328 |
| 5,671,257 | 9/1997 | Cochran et al. | 375/355 |

*Primary Examiner*—Stephen Chin
*Assistant Examiner*—Jeffrey W. Gluck
*Attorney, Agent, or Firm*—Dicran Halajian

[57] ABSTRACT

A method of, and apparatus for, symbol timing recovery, comprising asynchronously sampling a signal burst at a predetermined plurality of times per symbol period, combining corresponding samples occurring in successive sampling cycle periods, making a soft decision on each combination of samples, and selecting for demodulation a timing offset(i) giving the largest soft decision.

13 Claims, 5 Drawing Sheets

DETERMINATION OF SYMBOL SAMPLE TIMING USING SOFT DECISIONS

FIELD OF THE INVENTION

The present invention relates to a method of, and apparatus for, symbol timing recovery in a signal burst. The signal burst may, for example, comprise a burst of π/4-DQPSK modulated signal as used in a digital telecommunications system such as TETRA (Trans European Trunked Radio).

1. Background of the Invention

In flat, non frequency—selective fading channels, the optimum symbol sampling instant is well defined and a good estimate of it may be obtained using any one of a number of known algorithms.

In dispersive channels, however, intersymbol interference (ISI) is present at every possible instant, so a different criterion for optimum sampling must be defined. This criterion will depend on the detection method to be used. For example for a simple sample by sample detection, the aim is to minimise the ISI in some sense, while a MLSE sequence estimator benefits from a maximised total signal energy.

2. Summary of the Invention

An object of the present invention is to recover symbol timing of a signal sequence.

According to a first aspect of the present invention there is provided a method of symbol timing recovery, comprising calculating the average soft decision measure for a complete signal burst at different timing offsets and selecting for demodulation the offset giving the largest soft decision measure.

More particularly the first aspect of the present invention relates to a method of symbol timing recovery, comprising asynchronously sampling a signal burst at a predetermined plurality of times per symbol period, combining corresponding samples occurring in successive sampling cycle periods, making a soft decision on each combination of samples, and selecting for demodulation a timing offset giving the largest soft decision.

According to a second aspect of the present invention there is provided a receiver comprising means for asynchronously sampling a signal at a predetermined plurality of times per symbol period, means for combining corresponding samples occurring in successive sample cycle periods, means for making a soft decision on each combination of samples, and means for selecting for demodulation a timing offset giving the largest soft decision.

BRIEF DESCRIPTION OF THE DRAWINGS

The present invention will now be described, by way of example, with reference to the accompanying drawings, wherein.

In the drawings the same reference numerals have been used to indicate corresponding features.

DESCRIPTION OF PREFERRED EMBODIMENTS

Figure 1:
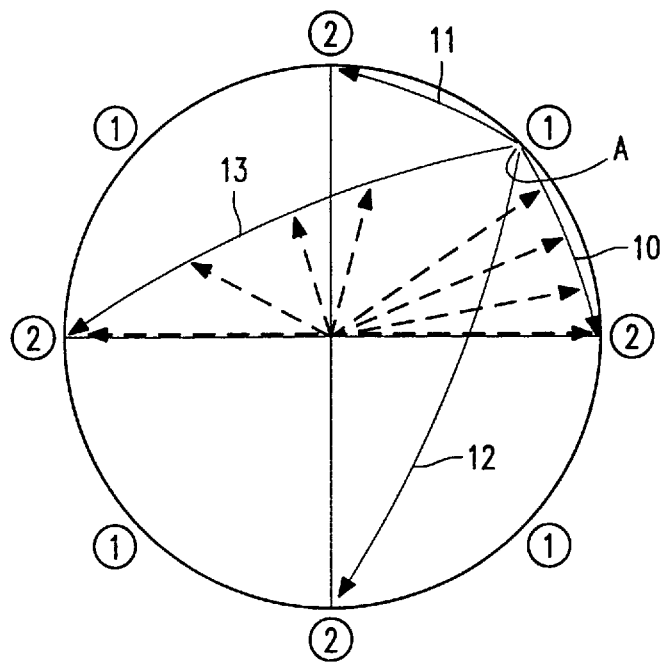
FIG. 1 illustrates a π/4-DQPSK signal constellation.

Referring to FIG. 1, the π/4-DQPSK signal constellation comprises four points 1 or 2 with correspondingly numbered points being separated by 90° or π/2. Each point or symbol is represented by a dibit, that is 00, 01, 10 and 11. In accordance with a π/4-DQPSK each phase change has one of four values π/4, −π/4, 3π/4 and −3π/4 respectively shown in FIG. 1 by the arrows 10, 11, 12 and 13. In proceeding from A, the arrows all terminate at a point referenced 2 and the next following phase change will terminate at a point on the constellation, referenced 1, and so on.

Another point to observe is that if a phase change is sampled say at 4 points during a transition from the point A, then in the case of a π/4 transition, say that represented by the arrow 10, there is a relatively small change in amplitudes as indicated by the broken lines compared to the relatively large changes of amplitudes which occur with a phase change of 3 π/4, say that represented by the arrow 13. The method in accordance with the present invention makes use of this observation in determining timing instant for symbol recovery.

Figure 2:
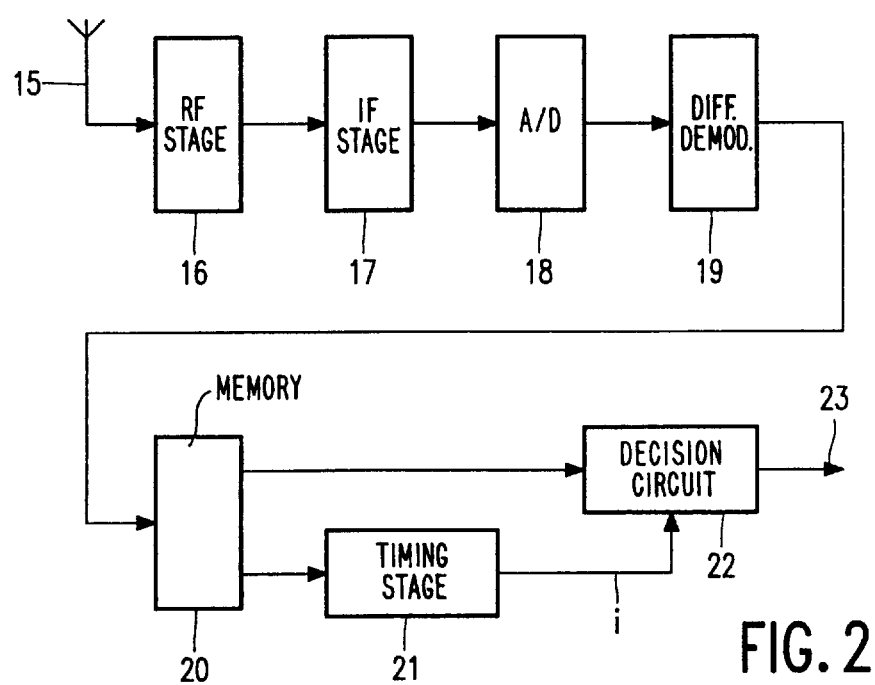
FIG. 2 is a block schematic diagram of a receiver made in accordance with the present invention.

The receiver shown in FIG. 2 comprises an antenna 15 coupled to an RF stage 16 which in turn is coupled to an IF stage 17. An analog to digital converter 18 operating at 4 times the symbol rate digitises the output from the IF stage 17 and the digital values or samples are applied to a differential demodulator stage 19 which determines the phase difference between the samples. The samples are stored in a memory 20. A timing stage 21 is coupled to an output of the memory 20 and operates by summing the samples for each phase shift, and on the basis of determining the maximum value, it decides the timing position i which is used to trigger a decision circuit 22, which circuit 22 is also connected to the store 20, to provide a bit value decision on its output 23.

Figure 3:
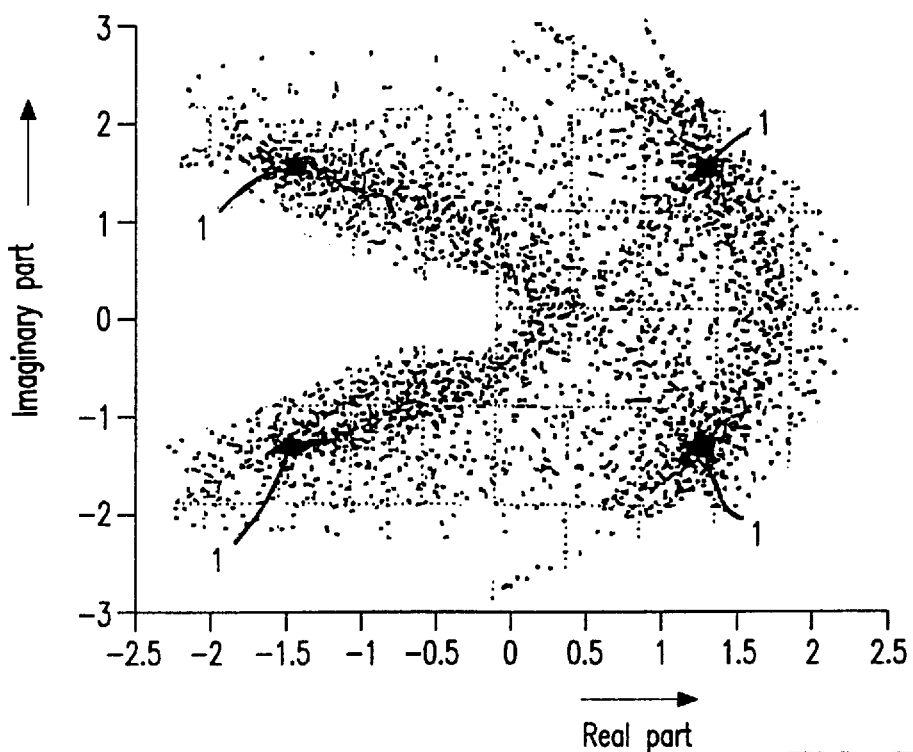
FIG. 3 is a plot of the sampled output of the differential demodulator, the abscissa representing the real part and the ordinate representing the imaginary part.

FIG. 3 is a plot of the sampled output of the differential demodulator 19 (FIG. 2) and on examination the points 1 can be seen on or about the coordinates 1.5, 1.5; −1.5, 1.5; −1.5, −1.5 and 1.5, −1.5. Also the plots are asymmetrical about the ordinate or imaginary axis because the phase transitions of +3 π/4 and −3 π/4 require a much greater amplitude swing than the two other phase transitions. The method in accordance with the present invention makes use of the fact that discrimination can be increased by using only the differential samples in the left hand half of FIG. 3 so that as a consequence most of the timing measures arise from the ±3 π/4 phase transitions.

Figure 4A:
FIGS. 4A to 4C illustrate how the dots in FIG. 3 are derived.
Figure 4B:
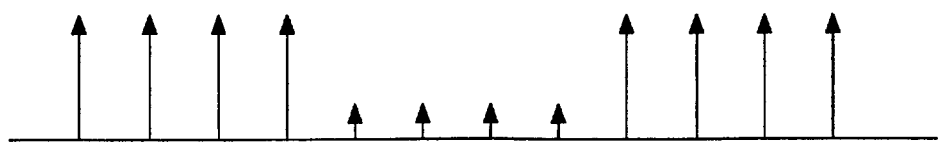
Figure 4C:
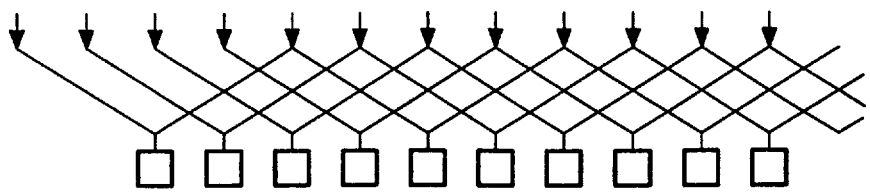

FIGS. 4A to 4C illustrate how the dots in FIG. 3 are derived. FIG. 4A illustrates a signal at the symbol rate. FIG. 4B illustrates over sampling the signal at 4 times the symbol rate.

FIG. 4C shows successive pairs of samples having the same offset, that is the nth and the (n+4)th samples (with 4 times oversampling), where n is an interger having a value between 1 and the maximum number of samples per symbol, being combined (multiplied) to form preliminary soft decisions which constitute the dots in FIG. 3. Alternatively these combinations of samples could be divided by the variance to give a soft decision indicated by a dot in FIG. 3.

The timing stage 21 (FIG. 2) chooses the timing position i by calculating the average soft decision (SD) (log likelihood) measure for a complete burst at different timing offsets and selects the offset with the greatest SD measure for demodulation.

For the k-th dibit, the log—likelihood measures are given by:

$$\lambda^a_{mk+i} = \frac{\Re(r_{mk+i} r^*_{m(k-1)+i})}{\sigma_i^{\wedge 2}} \quad (1)$$

$$\lambda^b_{mk+i} = \frac{\Im(r_{mk+i} r^*_{m(k-1)+i})}{\sigma_i^{\wedge 2}} \quad (2)$$

In these expressions, $\lambda^a_{mk+1}$ and $\lambda^b_{mk+i}$ are the soft decisions in respect of the bits forming the dibits, k indexes the current symbol, $\Re$ is the real part, $\Im$ is the imaginary part, m is the number of received samples per symbol and i is the timing offset. The term $\sigma^{\wedge 2}_i$ is an estimate of the variance of the noise, which may be from thermal, intersymbol or co-channel sources, which should be normally distributed for optimum results. This noise can only be assumed truly constant with i in the thermal case. An algorithm for estimating this variance consists of the following expressions:

$$\sigma_{i\,^{\wedge}2} = \frac{1}{2N} \sum_{k=1}^{N} n_{mk+i} \quad (3)$$

where N is the number of symbols used in the estimation and the noise samples n are taken from the components of the received signal which are in quadrature to the most likely received symbol, using the following expressions:

$$n_{mk+i} = \min(u_{mk+i}, v_{mk+i}) \quad (4)$$

$$u_{mk+1} = |\Re(r_{mk+i} r^*_{m(k-1)+i}) e^{\frac{j\pi}{4}}| \quad (5)$$

$$v_{mk+1} = |\Im(r_{mk+i} r^*_{m(k-1)+i}) e^{\frac{j\pi}{4}}| \quad (6)$$

High confidence in subsequent decisions corresponds to a high magnitude for either $\lambda^a$ or $\lambda^b$. The SD timing method therefore chooses the timing position i so as to maximise the sum of the $\lambda$ terms over the whole estimation window:

$$i_{choice} = \left[ i: \sum_{k=1}^{N} |\lambda^a_{mk+i}| + |\lambda^b_{mk+i}| = \max \text{ over } i \right] \quad (7)$$

$$= \left[ i: \frac{1}{\sigma_{i\,^{\wedge}2}} \sum_{k=1}^{N} |\Re(r_{mk+i} r^*_{m(k-1)+i})| + |\Im(r_{mk+i} r^*_{m(k-1)+i})| = \max \text{ over } i \right] \quad (8)$$

The numerator part of the above expression relates to maximising the signal part of the output of the differential demodulator, while the denominator relates to minimising the noise and interference.

Figure 5:
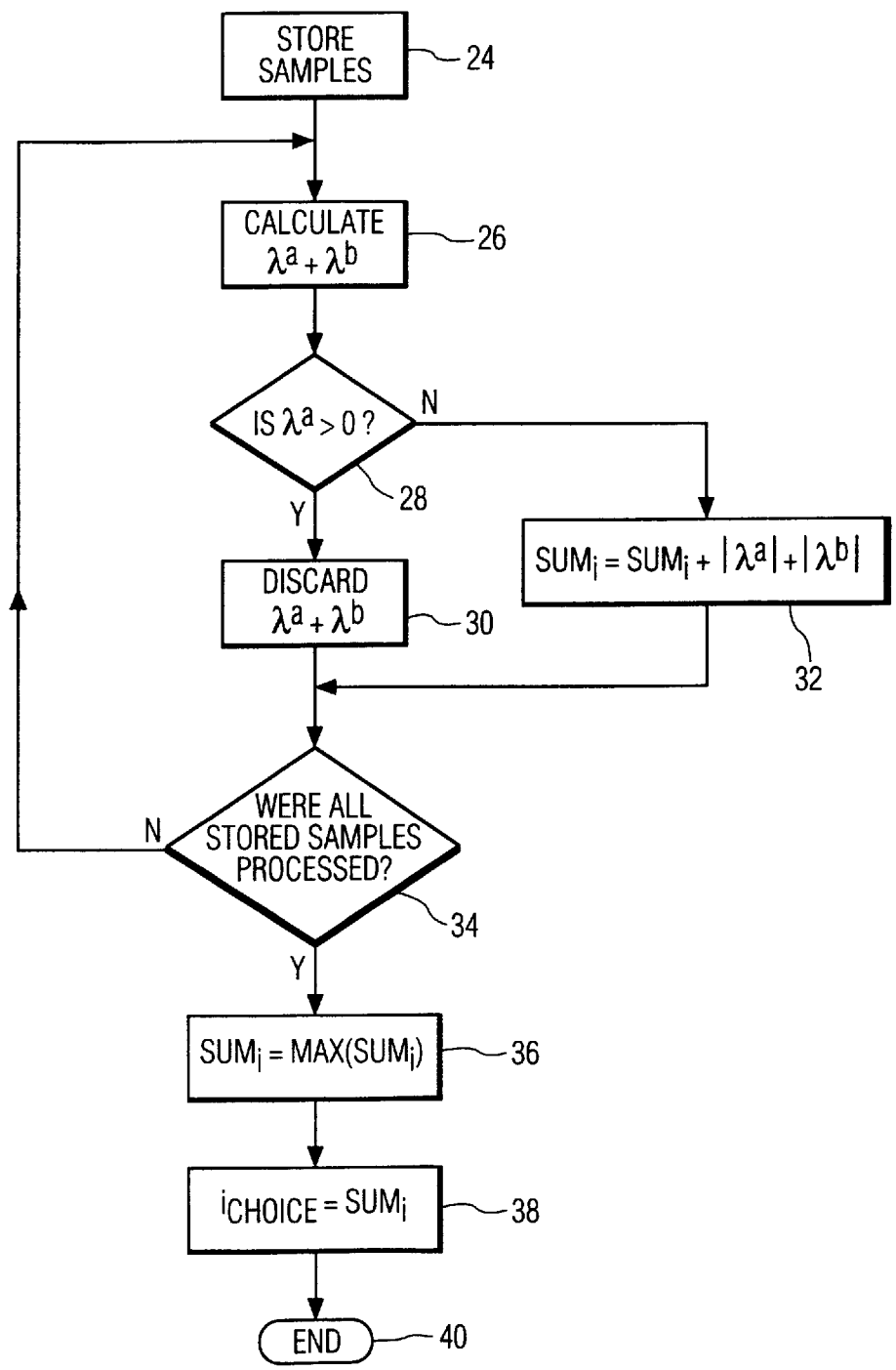
FIG. 5 is a flow chart for illustrating one embodiment of the method in accordance with the present invention.

A flow chart illustrating steps involved in choosing $i_{choice}$ is shown in FIG. 5. The block 24 relates to the operation of storing the samples in the memory 20 (FIG. 2). Block 26 relates to calculating the soft decisions $\lambda^a$ and $\lambda^b$ for each sample. Block 28 is a decision block in which the differential samples on the left hand half of FIG. 3 are selected by the question "Is $\lambda^a$ greater than 0?" If the answer is Yes (Y) then in block 30 the associated values of $\lambda^a$ and $\lambda^b$ are discarded. Alternatively if the answer is No (N), then in block 32 the following calculation is carried out:

$$SUM_i = SUM_i + |\lambda^a| + |\lambda^b|$$

In block 34, a check is made to ensure that all the samples in the memory 20 have been processed. If the answer is No (N) the flow chart reverts to the block 26 but if the answer is Yes (Y), the flow chart proceeds to block 36 in which the largest value of $SUM_i$, is selected. In block 38, this value is relayed as $i_{choice}$ to the decision circuit 22 (FIG. 2). Thereafter the flow chart is terminated, which operation is represented by block 40.

Figure 6:
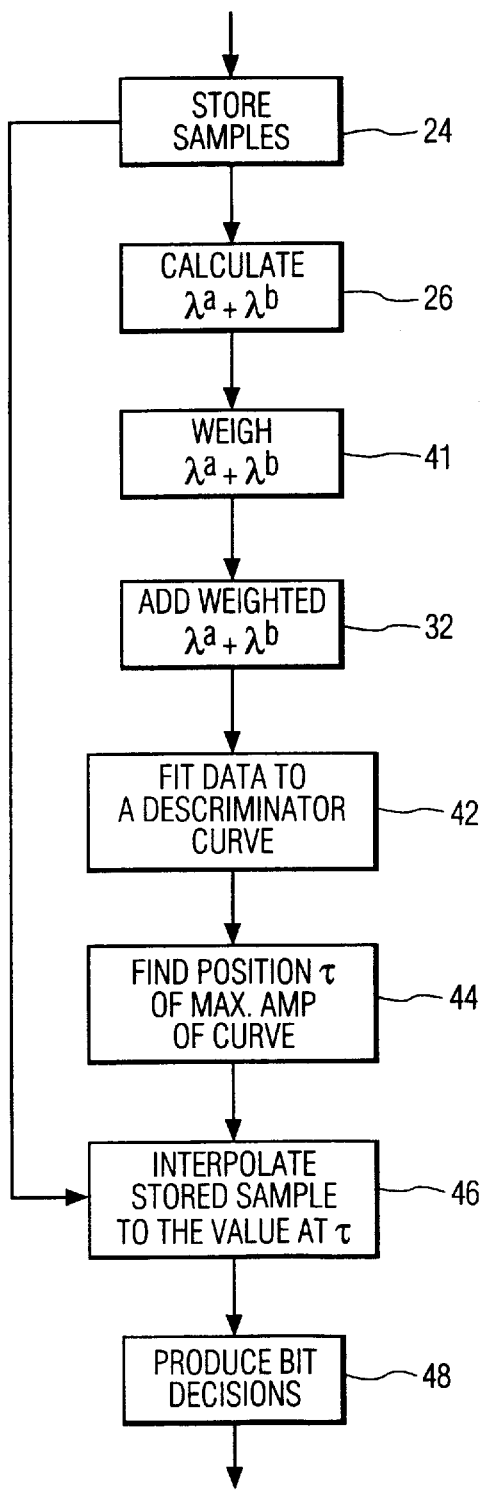
FIG. 6 is a flow chart illustrating a variant of the method in accordance with the present invention.
Figure 7:
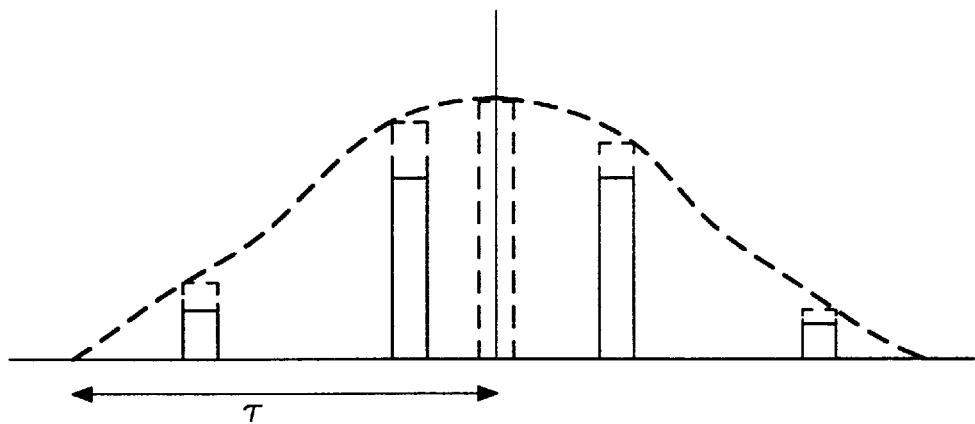
FIG. 7 shows a plurality of samples which are overlaid by an idealised discriminator curve.
Figure 8:
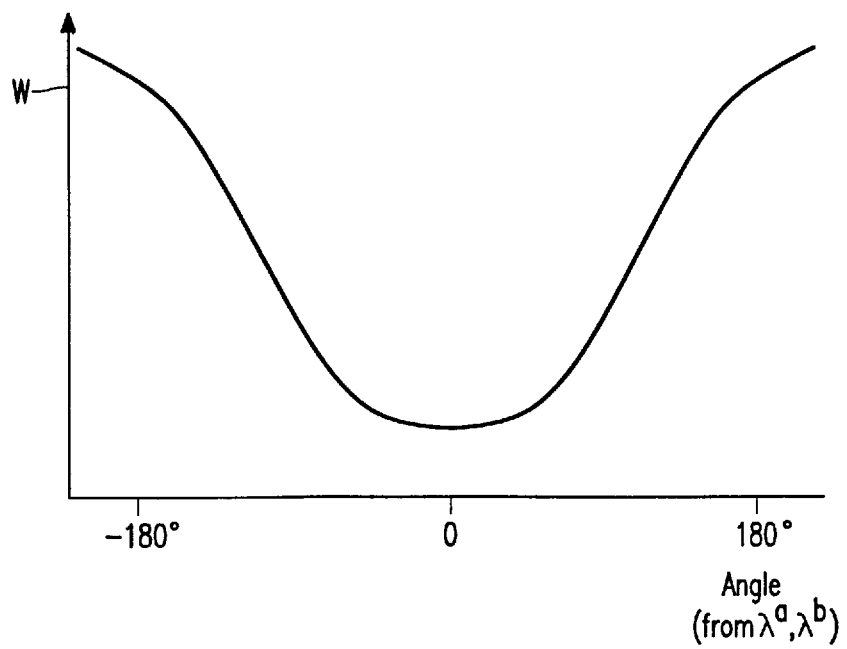
FIG. 8 illustrates a weighting curve.

FIG. 6 is a flow chart relating to a variant of that shown in FIG. 5 which is intended to cover the situations firstly that the instants of sampling may miss an ideal sampling point (FIG. 7), so a prestored representation ideal discriminator curve (shown in broken lines) is used to interpolate on the raw samples and secondly that as the bits may not be evenly distributed, sums are calculated for the negative and positive half planes, instead of the half plane only (blocks 28, 32—FIG. 5), and the negative sums are weighted bigger than the positive sums using the curve shown in FIG. 8 and all the decisions are added together. A decision is then made on whether a particular offset is selected or the value of $\tau$ which is the position of the maximum value of the prestored representation of an ideal discriminator curve, shown as a dashed curve FIG. 7.

In FIG. 6 the block 24 indicates the storing of the samples. The block 26 represents the calculation of soft decisions $\lambda^a$ and $\lambda^b$. In block 41, the soft decisions are weighted in accordance with the curve shown in FIG. 8 and in the block 32 the sums are calculated.

Block 42 denotes the fitting of the descriminator curve and in block 44 the position ($\tau$) of the maximum is found. In the block 46 the samples stored in the block 24 are interpolated to the value at $\tau$ and the interpolated values are applied to a decision stage, block 48, which produces the bit decisions.

From reading the present disclosure, other modifications will be apparent to persons skilled in the art. Such modifications may involve other features which are already known in the design, manufacture and use of receiving systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is :

1. A method of symbol timing recovery, comprising the steps of:

calculating soft decision measures having different timing offsets for a complete signal burst;

comparing the soft decision measures with a predetermined value; and combining first soft decision measures which do not exceed the predetermined value and discarding second soft decision measures which exceed the predetermined value; said first soft decision measures having greater amplitude swings than amplitude swings of said second soft decision measures.

2. A method as claimed in claim 1, wherein said first soft decision measures have one polarity and said second soft decision measures have another polarity.

3. A method as claimed in claim 1, wherein said first soft decision measures have a negative polarity and said second soft decision measures have a positive polarity.

4. A method of symbol timing recovery, comprising the steps of:

calculating soft decision measures having different timing offsets for a complete signal burst;

forming combinations of soft decision measures having a negative polarity; and selecting from said combinations an optimal timing offset giving a largest decision measure for demodulation.

5. A method of symbol timing recovery, comprising the steps of:

calculating soft decision measures having different timing offsets for a complete signal burst, said soft decision measures being calculated from samples of successive symbols having substantially similar offsets within said successive symbols;

fitting a discriminator curve to the soft decision measures;

finding a timing offset corresponding to a maximum value of said discriminator curve;

interpolating the soft decision measures to said maximum value; and making bit decisions on the basis of the interpolated values.

6. A method as claimed in claim 5, wherein the soft decision measures are log-likelihood measures.

7. A method as claimed in claim 5, wherein symbols are recovered from a received signal by differential detection.

8. A method as claimed in claim 5, prior to the fitting step, further comprising the steps of:

weighting the soft decision measures; and combining the soft decision measures.

9. A method as claimed in claim 8, wherein the weighting step weights first soft decision measures having one polarity more than second soft decision measures having another polarity.

10. A method of symbol timing recovery, comprising the steps of:

asynchronously sampling a signal burst at a predetermined plurality of times per symbol period, combining samples occurring in successive symbol periods to form soft decisions from combinations of said samples, fitting a discriminator curve to the soft decisions;

finding a timing offset corresponding to a maximum value of said discriminator curve;

interpolating the soft decisions to said maximum value; and making bit decisions on the basis of the interpolated values.

11. A receiver comprising:

a sampler which asynchronously samples a signal at a predetermined plurality of times per symbol period, and a device which combines corresponding samples occurring in successive symbol periods to form soft decisions;

said device fitting a discriminator curve to the soft decisions;

finding a timing offset corresponding to a maximum value of said discriminator curve;

interpolating the soft decisions to said maximum value; and making bit decisions on the basis of the interpolated values.

12. A receiver as claimed in claim 11 further comprising a receiving unit which receives the signal, said device including a detector which differentially detects phase differences between samples of the signal to recover symbols from the signal.

13. A receiver as claimed in claim 12, wherein said device further includes:

a memory for storing differentially detected samples provided from said detector, said memory being coupled within said device such that said device combines samples associated with corresponding phase shifts and for determining which of the phase shifts generates a maximum value, and a decision circuit coupled to the memory for providing the interpolated values for demodulation in response to a timing position of the phase shift generating a maximum value.

* * * * *